United States Patent
Lv et al.

(10) Patent No.: US 11,663,134 B2
(45) Date of Patent: May 30, 2023

(54) METHOD, DEVICE AND COMPUTER PROGRAM PRODUCT FOR IMPLEMENTING FILE SYSTEM

(71) Applicant: EMC IP Holding Company LLC, Hopkinton, MA (US)

(72) Inventors: Shuo Lv, Beijing (CN); Ming Zhang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 205 days.

(21) Appl. No.: 16/843,016

(22) Filed: Apr. 8, 2020

(65) Prior Publication Data
US 2020/0364148 A1 Nov. 19, 2020

(30) Foreign Application Priority Data
May 15, 2019 (CN) .......................... 201910403635.9

(51) Int. Cl.
| | |
|---|---|
| *G06F 12/0871* | (2016.01) |
| *G06F 12/02* | (2006.01) |
| *G06F 16/182* | (2019.01) |
| *G06F 16/22* | (2019.01) |
| *G06F 11/30* | (2006.01) |
| *G06F 16/17* | (2019.01) |

(52) U.S. Cl.
CPC ...... *G06F 12/0871* (2013.01); *G06F 11/3034* (2013.01); *G06F 12/0246* (2013.01); *G06F 16/1734* (2019.01); *G06F 16/182* (2019.01); *G06F 16/22* (2019.01); *G06F 2212/7201* (2013.01)

(58) Field of Classification Search
CPC ............ G06F 12/0871; G06F 12/0246; G06F 16/182; G06F 16/22; G06F 11/3034; G06F 16/1734; G06F 2212/7201; G06F 12/109; G06F 12/0292; G06F 2212/1016; G06F 16/188; G06F 16/13; G06F 16/172; G06F 3/0631; G06F 3/0643
See application file for complete search history.

(56) References Cited

U.S. PATENT DOCUMENTS

| | | | |
|---|---|---|---|
| 6,065,010 A * | 5/2000 | Otsuka | .................... G06F 16/40 |
| 9,703,498 B1 | 7/2017 | Armangau et al. | |
| 9,779,023 B1 | 10/2017 | Armangau et al. | |
| 9,965,201 B1 | 5/2018 | Bono et al. | |
| 10,942,845 B2 | 3/2021 | Chawla et al. | |
| 10,970,259 B1 | 4/2021 | Bono et al. | |
| 2002/0178261 A1* | 11/2002 | Chang | ................. H04L 67/1038 709/225 |
| 2007/0033323 A1* | 2/2007 | Gorobets | ............ G06F 12/0246 711/103 |
| 2009/0030956 A1* | 1/2009 | Zhang | ................. G06F 12/0223 |

(Continued)

*Primary Examiner* — Eric Cardwell
(74) *Attorney, Agent, or Firm* — BainwoodHuang

(57) ABSTRACT

Techniques involve implementing a file system. According to such techniques, a storage system creates a plurality of files in advance, each of which maintains a continuous space to simplify the process of processing read/write requests in the file system. When there is data to be written, an appropriate pre-created file is selected. Further, according to such techniques, a file system address is mapped to a physical address using a memory management unit. In this way, the file system performance is improved greatly.

17 Claims, 10 Drawing Sheets

(56) References Cited

U.S. PATENT DOCUMENTS

2013/0263141 A1\* 10/2013 Asaro ................... G06F 9/3834
  718/102
2020/0019535 A1\* 1/2020 Parker ................... G06F 16/122
2020/0311026 A1\* 10/2020 Du ....................... G06F 12/0891

\* cited by examiner

600

630

METHOD, DEVICE AND COMPUTER PROGRAM PRODUCT FOR IMPLEMENTING FILE SYSTEM

CROSS REFERENCE TO RELATED APPLICATION

This application claims priority to Chinese Patent Application No. CN201910403635.9 on file at the China National Intellectual Property Administration (CNIPA), having a filing date of May 15, 2019, and having "METHOD, DEVICE AND COMPUTER PROGRAM PRODUCT FOR IMPLEMENTING FILE SYSTEM" as a title, the contents and teachings of which are herein incorporated by reference in their entirety.

FIELD

Embodiments of the present disclosure generally relate to a file system for a storage system, and more specifically, to a method, a device and a computer program product for implementing a file system.

BACKGROUND

In current storage systems, there are differences in the speed of read/write due to different storage media. In order to increase the speed of read/write, various new storage media have been developed. In addition, the file system also affects the speed of read/write of the storage media. Therefore, there is a need to further improve storage media and file systems to increase the speed of read/write speed of storage systems.

SUMMARY

In general, embodiments of the present disclosure provide a method, a device and a computer program product for implementing a file system.

In accordance with the first aspect of the present disclosure, it provides a computer-implemented method. The method includes selecting a target file from a plurality of files based on a size of data to be stored, the plurality of files having continuous logical addresses and being allocated with physical storage resources; determining a logical address offset of the target file relative to a start logical address of the plurality of files based on an index of the target file; determining physical storage resources corresponding to the target file based on a mapping relationship between logical addresses and physical addresses of the storage system, the start logical address, and the logical address offset; and storing the data on the corresponding physical storage resources.

In accordance with the second aspect of the present disclosure, it provides an electronic device. The electronic device includes: at least one processing unit; and at least one memory coupled to the at least one processing unit and storing machine-executable instructions, the instructions, when implemented by the at least one processing unit, causing the device to perform acts, including: selecting a target file from a plurality of files based on a size of data to be stored, the plurality of files having continuous logical addresses and being allocated physical storage resources; determining a logical address offset of the target file relative to start logical addresses of the plurality of files based on an index of the target file; determining physical storage resources corresponding to the target file based on a mapping relationship between logical addresses and physical addresses of the storage system, the start logical address, and the logical address offset; and storing the data on the corresponding physical storage resources.

In accordance with the third aspect of the present disclosure, it provides a computer program product. The computer program product, tangibly stored on a non-transitory computer-readable medium and including machine executable instructions, the machine-executable instructions, when executed, causing a machine to select a target file from a plurality of files based on a size of data to be stored, the plurality of files having continuous logical addresses and being allocated with physical storage resources; determine a logical address offset of the target file relative to a start logical address of the plurality of files based on an index of the target file; determine physical storage resources corresponding to the target file based on a mapping relationship between logical addresses and physical addresses of the storage system, the start logical address, and the logical address offset; and store the data on the corresponding physical storage resources.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the following more detailed description of example embodiments of the present disclosure with reference to the accompanying drawings, the above and other objectives, features, and advantages of the present disclosure will become more apparent, wherein the same reference sign usually refers to the same component in the example embodiments of the present disclosure.

DETAILED DESCRIPTION

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Example embodiments of the present disclosure will be described in more details with reference to the drawings. Although the drawings illustrate example embodiments of the present disclosure, it should be appreciated that the present disclosure can be implemented in various manners and should not be limited to the embodiments explained herein. On the contrary, embodiments are provided to make the present disclosure more thorough and complete and to fully convey the scope of the present disclosure to those skilled in the art.

As used herein, the term "comprises" and its variants are to be read as open-ended terms that mean "comprises, but is not limited to." The term "or" is to be read as "and/or" unless the context clearly indicates otherwise. The term "based on" is to be read as "based at least in part on." The terms "one example embodiment" and "one embodiment" are to be read as "at least one example embodiment." The term "a further embodiment" is to be read as "at least a further embodiment." The terms "first", "second" and so on can refer to same or different objects. The following text also can include other explicit and implicit definitions.

Figure 1:
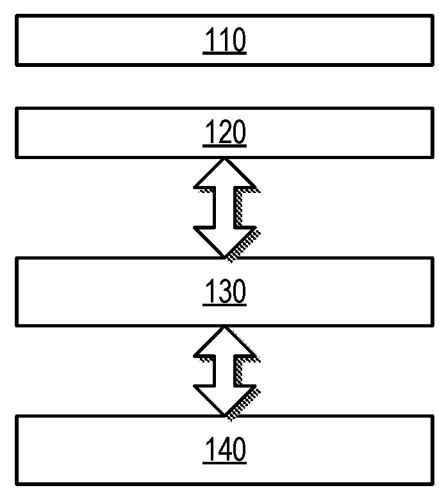
FIG. 1 illustrates a block diagram illustrating a file system architecture in a conventional technology.

FIG. 1 illustrates a block diagram of file system architecture in a conventional technology. Conventional file systems are built for the spinning or solid-state disks. As shown in FIG. 1, the file system includes a file system layer 110, a block layer 120, and a block device driver layer 130. The storage resources on a storage device 140 are used by the file system shown in FIG. 1. The IO stack in a storage system has three levels:

1. Taking write as an example, the file system layer 110 copies data of user-state specified by the write parameter to the file system cache, and flushes to the lower layer in some condition. Some file systems provide a wide range of information to represent many different types of file systems. There are some fields or functions to support each operation provided by all real file systems. For each read, write, or other function called, it substitutes the actual function which is implemented in real file systems.

2. Block layer, manage the IO queue of the block device, merge and sort the IO requests. The generic block layer is a component that handles the requests for all block devices in the system.

3. The block device driver layer interacts directly with the memory through DMA to complete the interaction between data and specific devices. Block device drivers are the lowest component. They get requests from I/O scheduler, and then process them.

New storage device (for example, AEP 3D XPOINT) can be attached directly to memory bus, thereby reducing latencies to access persistent storage. It also enables processor to access it through memory load/store instructions to store data. However, compared to disk drives, these devices usually have much shorter IO delay and higher bandwidth. The conventional file systems assume the underlying storage devices are I/O bus connected block devices, and file system are not designed for memory devices.

With traditional persistent storage devices (such as disk and solid-state disk SSD), the I/O delay overhead of the device is much higher than file system layer and device block layer. Thus, the storage system performance usually depends on the device features and the performance of I/O scheduler.

Figure 2:
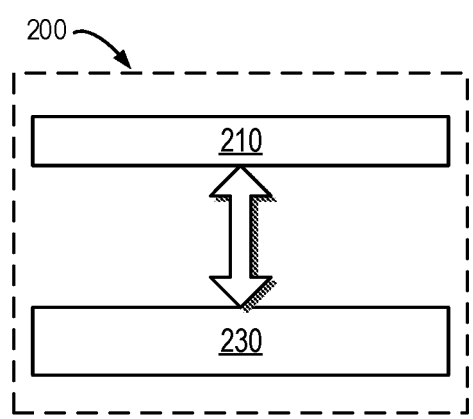
FIG. 2 illustrates a block diagram illustrating a file system architecture in accordance with an embodiment of the present disclosure.

In conventional file system hierarchy, there are many layers in IO stack. Additional overheads (block layer and device driver layer) are ignorable since the latency to access storage devices is much higher. When the storage device is attached directly to the memory bus and it can be accessed at memory speeds, these additional layer (block layer and device driver layer) overheads can substantially impact performance and hence it is necessary to avoid such overheads whenever possible. As shown in FIG. 2, an electronic device 200 that can implement embodiments of the present disclosure is composed of a file system layer 210 and a block layer and a device driver layer are ignored. A storage device 230 can be coupled to a memory bus.

When the storage devices are attached to the memory bus, both the storage devices and the main memory may share system resources such as the bandwidth of the memory bus, the CPU cache and the Translation Look-aside Buffers (TLBs). In this case, the overheads of file systems may impact the performance of the whole system, and file systems for 3D XPoint should consider these factors. Therefore, how to design and optimize a file system for storage devices (for example, 3D XPOINT) is a great challenge As described above, when the 3D XPOINT is attached directly to memory bus, it may share some critical system resources with the main memory. They may share the bandwidth of the memory bus, the CPU caches and TLBs for both instruction and data. The fewer IO layer can reduce the CPU overheads in the storage system, thereby improving the total performance.

Therefore, in accordance with the embodiments of the present disclosure, the storage system creates several files in advance each file maintains contiguous space, to simplify the process of handling read/write requests in the file system. When there is data needs to be written, an appropriate pre-created file is selected. In addition, according to embodiments of the present disclosure, the file system addresses are mapped to physical addresses by utilizing the memory management unit (MMU). In this way, the new file system improves the performance significantly.

Figure 3:
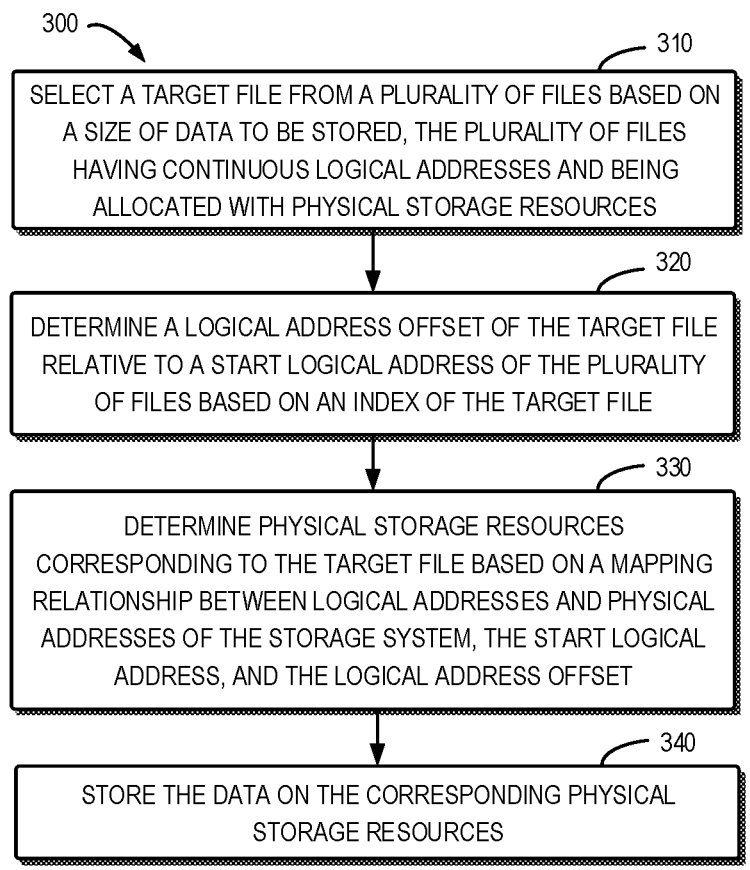
FIG. 3 illustrates a flow chart illustrating a method in accordance with an embodiment of the present disclosure.
Figure 4:
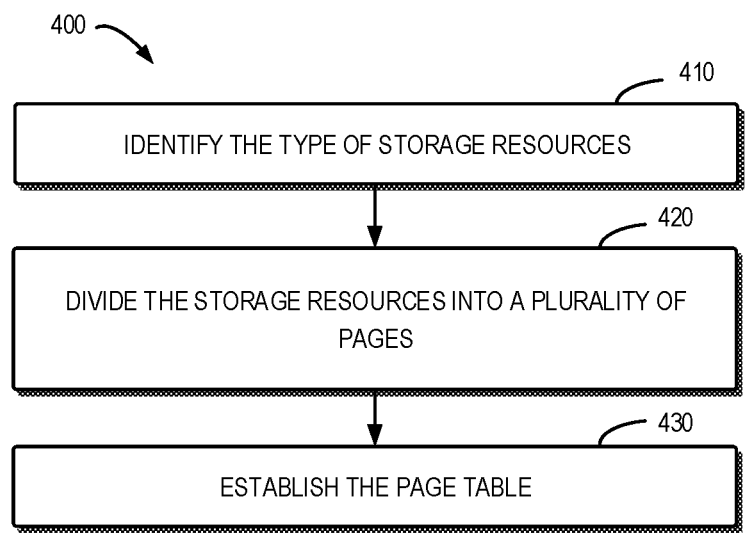
FIG. 4 illustrates a flow chart illustrating a method in accordance with an embodiment of the present disclosure.

FIG. 3 is a flow chart of a method 300 for writing data in accordance with embodiments of the present disclosure. The method 300 can be implemented in an electronic device 200. Embodiments of the present disclosure are described with a storage device of 3D XPOINT type as an example. It should be appreciated that embodiments of the present disclosure may be implemented in any other suitable storage device/storage media. Embodiments of the present disclosure are not limited in this aspect. A file system according to an embodiment of the present disclosure may be built on a memory management module. In some embodiments, the storage system may require initialization. FIG. 4 illustrates a flow chart of a method for initializing a storage system in accordance with certain embodiments of the present disclosure. It is to be understood that the method 400 is merely an example but not limitation.

At block 410, after the electronic device 200 is booted, the electronic device 200 recognizes the type of physical storage resources in the storage system. For example, if there are multiple physical storage resources in the storage system, the electronic device 200 recognizes the hardware type.

At block 420, the electronic device 200 divides the physical storage resources into a plurality of pages. The electronic device 200 divides the physical storage resources into pages with a certain size, which can serve as a minimum storage unit.

At block 430, the electronic device 200 creates a page table. Accordingly, the electronic device 200 can operate the file system according to embodiments of the present disclosure in a page table manner.

In some embodiments, the electronic device 200 modifies an E820 table, which is generated by BIOS to report the memory map to the operating system. In accordance with embodiments of the present disclosure, the E820 table includes a new address range type "3DXRangeStorage". This type of address range should only contain storage devices for the 3D XPOINT. This modification makes sure that the operating system could distinguish the AEP 3D XPOINT from other storage devices.

In some embodiments, each node corresponds to a struct pglist_data structure, which is divided into several areas by the zone. Generally, there are DMA, NORMAL zone. Each zone records available storage device of the zone through the structure free_area, and there are two lru linked lists. The free_area maintains all available storage device through 11 linked lists, and the element code on each linked list has a continuous page length of 2<<n.

In some embodiments, the operations for completing initialization of storage devices are mainly function start_kernel( ) and function setup_arch( ) where the function setup_arch calls function start_kernel( ). The initialization of the subsequent zone structure member may require the global variable memblock, so the function setup_arch( ) starts operations of maximal page frame number query, memblock creation and the like.

Figure 5:
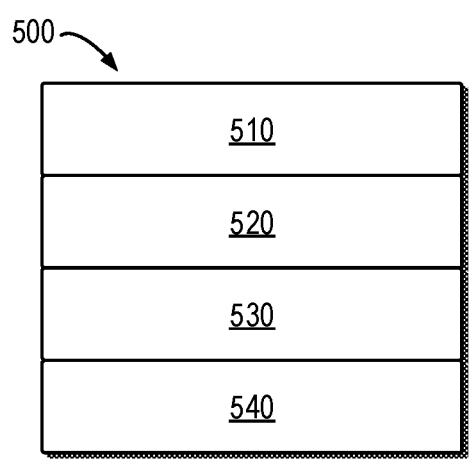
FIG. 5 illustrates a schematic diagram illustrating a data structure in accordance with embodiments of the present disclosure.

FIG. 5 illustrates a schematic diagram of a data structure 500 of struct pglist_data in accordance with an embodiment of the present disclosure. The struct pglist_data structure 500 includes four regions: ZONE DMA 510, ZONE DMA32 520, ZONE NORMAL 530, and ZONE 3DSTOR 540. When the storage device is allocated, the structure of struct pglist_data 500 has the structures of struct zonelis and the order of zones arranged in the structure is determined by the function build_zonelist. The meaning of the structure is: when applying for storage devices in ZONE_NORMAL and lacking of storage devices, it may automatically apply to ZONE_MDA32, which may be extended in sequence. When the storage devices allocation is only in ZONE 3DSTOR, it can simply modify the process direction in funcation get_page_from_free_list( ).

Figure 6A:
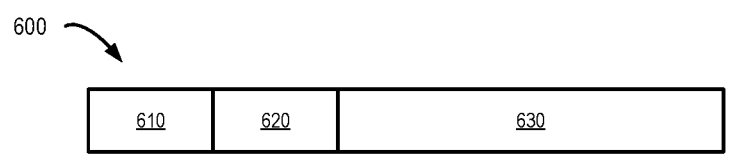
FIGS. 6A and 6B illustrate schematic diagrams of a file system layout in accordance with embodiments of the present disclosure.

Referring to FIG. 6A, a schematic diagram of a file system layout 600 is illustrated, in accordance with certain embodiments of the present disclosure. It should be appreciated that the file system layout 600 illustrated in FIG. 6A is merely by way of example and not limiting. As shown in FIG. 6, file system layout 600 includes a metadata portion 610, a mapping table portion 620, and a file system space portion 630.

In some embodiments, the metadata portion 610 may include information of storage, such as a size of physical 3D XPOINT, a size of mapping table and the like. The mapping table portion 620 may include a mapping table of the storage devices. The file system needs this information when mounted to build some memory data structures, which are mostly maintained by the memory management module during runtime. Any modification to these data structures may be flushed back into this region immediately.

Figure 6B:
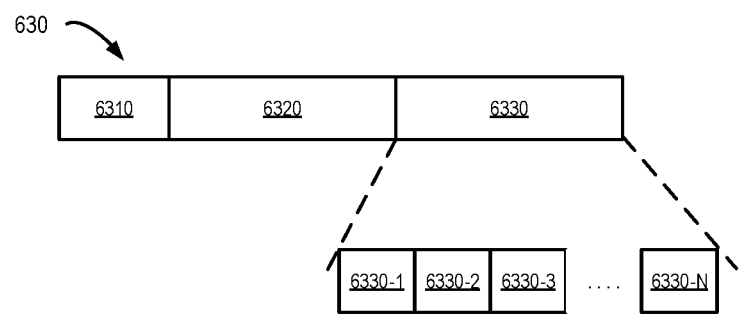

FIG. 6B illustrates a schematic diagram illustrating of file system space portion 630 in accordance with certain embodiments of the present disclosure. As shown in FIG. 6B, the file system space portion 630 includes a super block 6310, an inode table 6320 and a file system 6330. The super block 6310 includes the information about the whole file system, such as file system magic number, version number, block size, counters for inodes and blocks, and the total number of inodes. The inode table portion 6320 includes fundamental information of each file or directory, such as file mode, file name, owner id, group id, file size in bytes, the last time when the file was accessed (atime), the last time when the file was modified (mtime), the time when the file was created (ctime), a start address of the data for the file and the like. The first item (with inode number 0) in the inode table 6320 is the root inode that is always a directory. All the content of the files in the file system are stored in the file part 6330. In some embodiments, the total size of virtual memory space for new file system is $2^{47}$ bytes, which is unused in system.

In some embodiments, there is also a pointer to the start address of inode table in the super block. In the inode table, a fixed size of entry is used for each inode, which is 256 bytes, and it is very easy to get a file's metadata through its inode number and the start address of the inode table.

In accordance with embodiments of the present disclosure, the file system can be easily recovered after rebooting with the layouts. First, the electronic device 200 checks if the "metadata" is valid with the magic number and version number, then the information in the "metadata" and "mapping table" are used to build the mapping between the physical addresses and the virtual addresses. Once this operation is completed, the information about the file system can be obtained from the super block 6310 in the virtual address space. It should be noted that both the physical and the virtual address in the mapping table need to be relative instead of absolute in order to provide the portability between different machines and systems.

Returning to FIG. 3, at block 310, the electronic device 200 selects the target file from a plurality of files based on the size of the data to be stored (for example, 6330-1, 6330-2, 6330-3 . . . 6330-N (where N is any suitable positive integer). The plurality of files may be created in advance. These files have no name or data but have already been allocated some physical storage resources. Through the pre-created files, it can reduce the number of allocation and de-allocation operations significantly and improve the file system performance.

In some embodiments, three sizes for each file in the plurality of files are recorded. The first one, "file size", is the actual size of the file. The second one, "virtual size" is the size of the virtual space allocated to the file. The last one, "mapped size", is the size of mapped virtual space for the file, which is also the size of physical space allocated to the file. The value of "virtual size" is always larger than or equal to that of "mapped size" whose value is always larger than or equal to that of "file size".

Figure 7:
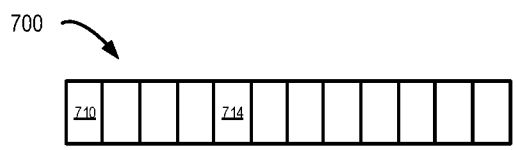
FIG. 7 illustrates a schematic diagram illustrating a logical address structure in accordance with embodiments of the present disclosure.

The plurality of files have contiguous physical address. FIG. 7 shows the physical address of the plurality of files. To achieve this, the electronic device 200 may build the file system on virtual address space, which can be larger than the physical address space of the 3D XPOINT. The electronic device 200 may use page mapping to maintain all the blocks within a file to have contiguous logical addresses as shown in FIG. 7. In this way, it does not need complicated data structures to keep track of logical address space, and simply store the start address and the size for each file. Furthermore, these files significantly simplify the process of the read/write requests.

In some embodiments, when an existing file needs to be deleted, the electronic device 200 may mark it as an empty file instead of releasing.

At block 320, the electronic device 200 determines a logical address offset of the target files relative to the start logical address of the plurality of files based on the index of the target file. Only as an example, the target file may be the file 6330-2. It can be understood that the target file can be any suitable created file. In some embodiments, the electronic device 200 can determine the logical address offset of the target file 6330-2 based on the index of the target file 6330-2 in the inode table 6320 portion. Only as an example, the logical address offset of electronic device 200 is 4.

At block 330, the electronic device 200 determines the physical storage resources corresponding to the target file 6330-2 based on a mapping relationship between the logical address and the physical address, a start logical address and the logical address offset. As shown in FIG. 7, the start logical address of the plurality of files is the logical address 710, and the logical address offset of the target file 6330-2 is 4, so the logical address of the target file 6330-2 is the address 714.

As described above, the electronic device 200 can perform mapping of logical addresses to physical addresses and store the mapping relationship. The electronic device 200 can determine the physical address corresponding to the logical address 710, that is, the physical storage resources corresponding to the target file 6330-2, according to the mapping relationship.

At block 340, the electronic device 200 stores the data on the corresponding physical storage resources. In this way, the overhead of I/O and the latency of writing are reduced.

In some embodiments, the electronic device 200 can receive a request to read data. The electronic device 200 can determine the target file corresponding to the data, such as the target file 6330-2. In some embodiments, the electronic device 200 can determine the logical address offset of the target file 6330-2 based on the index of the target file 6330-2 in the inode table 6320 portion. Only as an example, the logical address offset of electronic device 200 is 4. The electronic device 200 may determine physical storage resources corresponding to the target file 6330-2 based on a mapping relationship between the logical address and the physical address, the start logical address, and the logical address offset. As shown in FIG. 7, the start logical address of the plurality of files is the logical address 710, and the logical address offset of the target file 6330-2 is 4, hence the logical address of the target file 6330-2 is the address 714. As described above, the electronic device 200 can perform mapping of logical addresses to physical addresses and store the mapping relationship. The electronic device 200 can determine the physical address corresponding to the logical address 710, that is, the physical storage resources corresponding to the target file 6330-2, according to the mapping relationship. The electronic device 200 can read the data from the corresponding physical storage resource.

In some embodiments, the electronic device 200 can release the allocated physical storage resources. In some embodiments, when the unmapped resource in the storage system is lower than a threshold, the electronic device 200 may attempt to release the unnecessary physical storage resources that have been mapped but not used. During reclaiming of the physical storage resources, the electronic device 200 will may the number of empty files first. If the number exceeds a predefined threshold, the electronic device 200 may release the extra empty files and corresponding physical resources.

If the unallocated physical storage resources are still insufficient after releasing a certain number of empty files, the electronic device 200 may consider the cold files first which have not been modified for a long time, then the hot files. When the number of empty files in the storage system is below a predetermined number threshold, the electronic device 200 may create empty files.

In some embodiments, the electronic device 200 needs to ensure instructions are executed in order. The instruction fence guarantees that every previous load/store instruction has been finished before any load or store instruction follows. In some embodiments, if the electronic device 200 first receives a read/store request and then receives the instruction fence, the electronic device 200 can determine whether the read/store request is executed. If the electronic device 200 determines that the read/store request has been executed, the electronic device 200 processes the other requests if the electronic device 200 receives another read/store request. If the electronic device 200 determines that the read/store request is not being executed, if the electronic device 200 receives another read/store request, the electronic device 200 refuses to process the other request.

In other embodiments, the instruction flush is used to invalidate the cache line that contains the specified address from all levels of the processor cache hierarchy. By using the function "flush cache range", the electronic device 200 can provide the ensured write order to any range of addresses. The electronic device 200 always use the function "flush cache range" when we need to modify the critical information, including "metadata", "superblock", "inode table" and "directory files".

Figure 8A:
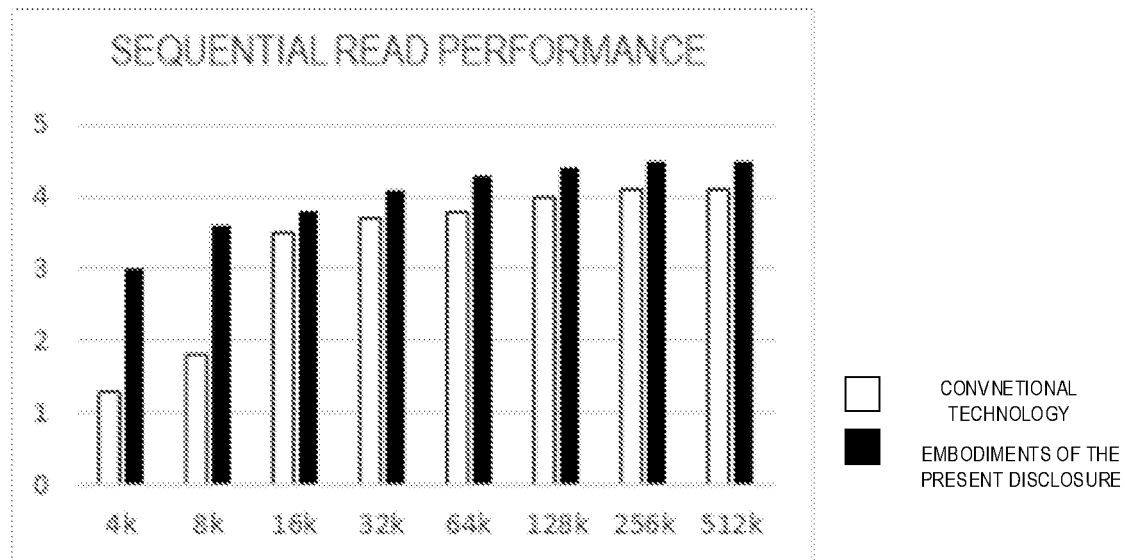
FIGS. 8A-8D are diagrams illustrating system performance in accordance with an embodiment of the present disclosure.
Figure 8B:
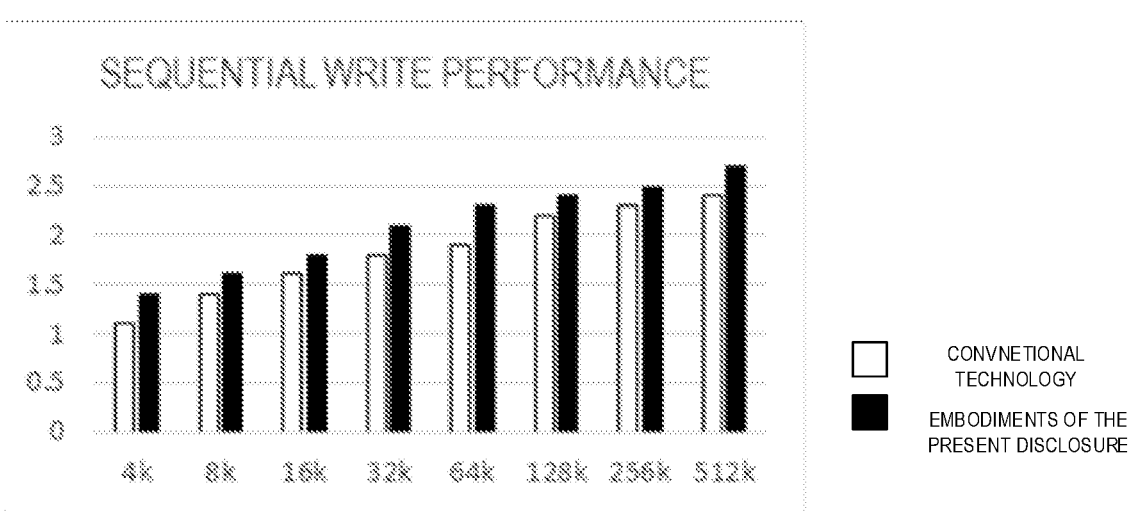
Figure 8C:
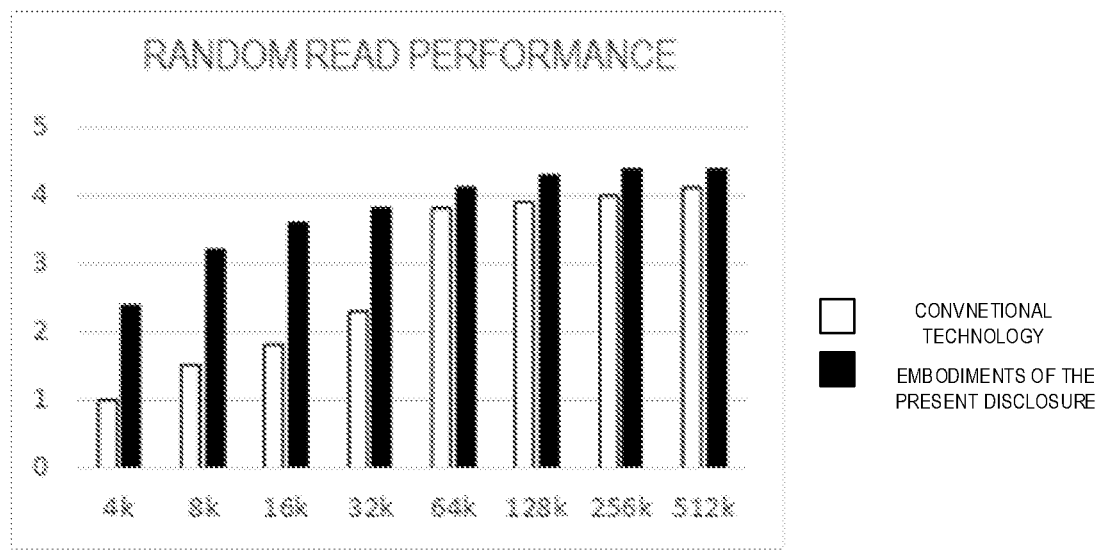
Figure 8D:
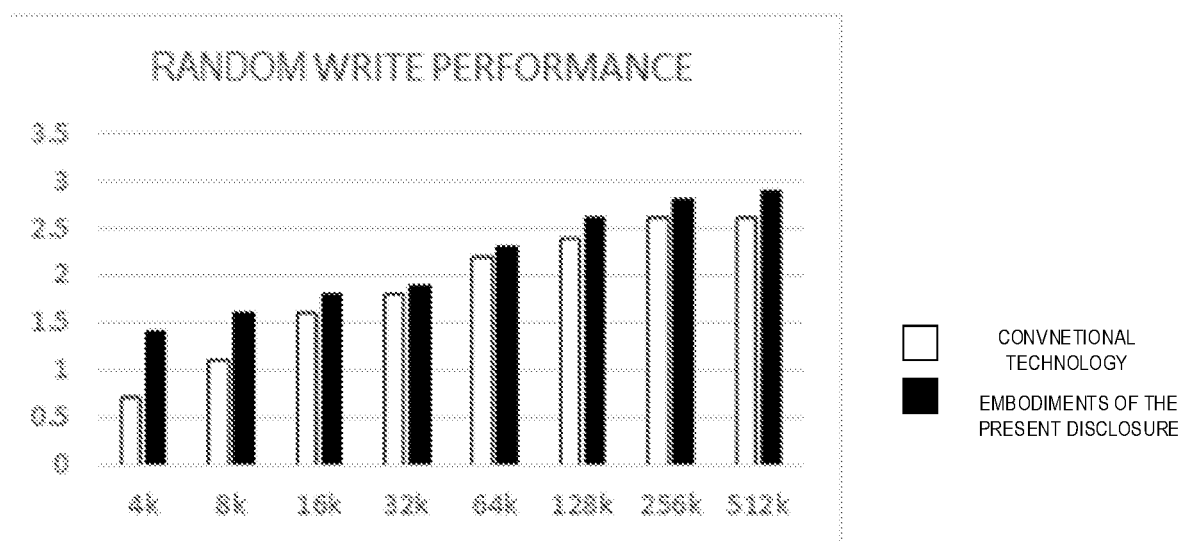

FIG. 8A-8D are system performance diagrams in accordance with an embodiment of the present disclosure. FIG. 8A illustrates system performance at the time of sequential reading in conventional techniques and embodiments of the present disclosure. FIG. 8B illustrates system performance at the time of sequential writing in conventional techniques and embodiments of the present disclosure. FIG. 8C illustrates system performance at the time of random reading in conventional techniques and embodiments of the present disclosure. FIG. 8D illustrates system performance at the time of sequential reading in conventional techniques and embodiments of the present disclosure. It can be seen that system performance in accordance with embodiments of the present disclosure is superior to system performance in accordance with conventional techniques.

Figure 9:
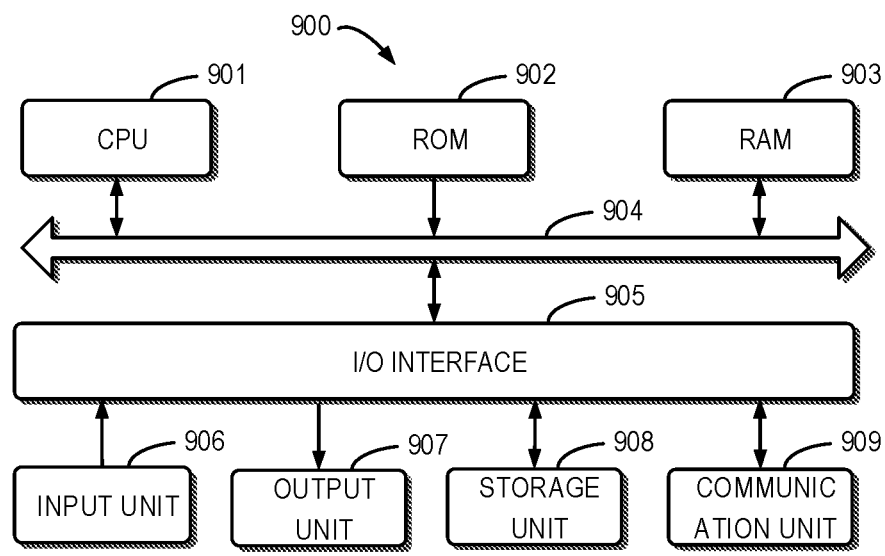
FIG. 9 illustrates a schematic block diagram of a device suitable for implementing embodiments of the present disclosure.

FIG. 9 illustrates a schematic block diagram of an electronic device 900 suitable for implementing embodiments of the present disclosure. As shown, the device 900 includes a central process unit (CPU) 901, which can execute various suitable actions and processing based on the computer program instructions stored in a read-only memory (ROM) 902 or computer program instructions loaded in a random-access memory (RAM) 903 from a storage unit 908. The RAM 903 can also store all kinds of programs and data required by the operations of the device 900. The CPU 901, ROM 902 and RAM 903 are connected to each other via a bus 904. An input/output (I/O) interface 905 is also connected to the bus 904.

A plurality of components in the device 900 is connected to the I/O interface 905, including: an input unit 906, such as keyboard, mouse and the like; an output unit 907, for example, various kinds of display and loudspeakers and the like; a storage unit 908, such as disk and optical disk and the like. and a communication unit 909, such as network card, modem, wireless transceiver and the like. The communication unit 909 allows the device 900 to exchange information/data with other devices via the computer network, such as Internet, and/or various telecommunication networks.

The above described each method or procedure, such as the procedure 500 and/or procedure 800, can be executed by the processing unit 901. For example, in some embodiments, the procedure 500 and/or procedure 800 can be implemented as a computer software program tangibly included in the machine-readable medium, for example, the storage unit 908. In some embodiments, the computer program can be partially or fully loaded and/or mounted to the device 900 via the ROM 902 and/or the communication unit 909. When the computer program is loaded to the RAM 903 and executed by the CPU 901, one or more actions of the above described the procedure 500 and/or procedure 800 can be implemented. Alternatively, the CPU 901 also can be configured to implement the above procedure in any other appropriate ways.

Based on the above description, it can be observed that the solution of the present disclosure is suitable for the following applications: in accordance with embodiments of the present disclosure, if a file is migrated between the first machine and the second machine, the data migration module compares the file with the files already stored in the second machine at the data chunk level, so as to migrate the modified and/or changed data chunks in the file into the second machine. Accordingly, the performance of data migration has been improved.

The present disclosure can be method, apparatus, system and/or computer program product. The computer program product can include a computer-readable storage medium, on which the computer-readable program instructions for executing various aspects of the present disclosure are loaded.

The computer-readable storage medium can be a tangible device that maintains and stores instructions utilized by the instruction executing apparatuses. The computer-readable storage medium can be, but not limited to, such as electrical storage device, magnetic storage device, optical storage device, electromagnetic storage device, semiconductor storage device or any appropriate combinations of the above. More concrete examples of the computer-readable storage medium (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

Computer readable program instructions described herein can be downloaded to respective computing/processing devices from a computer readable storage medium, or downloaded to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, by means of state information of the computer readable program instructions, an electronic circuitry including, for example, programmable logic circuitry, field-programmable gate arrays (FPGA), or programmable logic arrays (PLA) can be personalized to execute the computer readable program instructions, thereby implementing various aspects of the present disclosure.

Aspects of the present disclosure are described herein with reference to flowchart and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which are executed via the processor of the computer or other programmable data processing apparatus, create means (e.g., specialized circuitry) for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which are executed on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of codes, which includes one or more executable instructions for implementing the specified logical function(s). In some alternative implementations, the functions noted in the block may be implemented in an order different from those illustrated in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or by combinations of special purpose hardware and computer instructions.

The descriptions of the various embodiments of the present disclosure have been presented for illustration purposes, but are not intended to be exhaustive or limited to the embodiments disclosed. Many modifications and variations will be apparent to those of skilled in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A computer-implemented method, comprising:
    selecting, from a plurality of files, the plurality of files including a plurality of previously created empty files each storing no data, a target file for storing data, based on a size of data to be stored, wherein the plurality of files each have contiguous logical addresses and are allocated with physical storage resources, wherein the physical storage resources allocated to each one of the plurality of files have contiguous physical addresses, and wherein each one of the plurality of files has a file size indicating an actual size of the data stored in the file, a virtual size indicating an amount of virtual address space allocated to the file, and a mapped size indicating an amount of physical address space allocated to the file;
    determining a logical address offset of the target file relative to a start logical address of the plurality of files based on an index of the target file;
    determining physical storage resources corresponding to the target file based on a mapping relationship between logical addresses and physical addresses of a storage system, the start logical address, and the logical address offset; and
    storing the data on the corresponding physical storage resources.

2. The method of claim 1, further comprising:
    determining whether unallocated physical storage resources in the storage system is lower than a predetermined threshold of physical storage resource;
    in response to the unallocated physical storage resources being lower than the predetermined threshold of physical storage resource, determining whether a total number of the empty files in the plurality of files is higher than a predetermined threshold number; and
    in response to the total number of the empty files being higher than the predetermined threshold number, releasing physical storage resources being allocated to the empty files.

3. The method of claim 2, further comprising:
    in response to the number of empty files in the plurality of files being lower than a second predetermined threshold number, creating a plurality of empty files.

4. The method of claim 2, further comprising:
    in response to at least one existing file in the plurality of files needing to be deleted, marking the file as an empty file without releasing physical storage resources allocated to the file.

5. The method of claim 1, further comprising:
    receiving a request to read the data;
    determining the target file based on the request;
    determining the logical address offset of the target file relative to the start logical address of the plurality of files based on the index of the target file;
    determining the physical storage resources corresponding to the target file based on the mapping relationship, the start logical address, and the logical address offset; and
    reading the data from the corresponding physical storage resources.

6. The method of claim 1, further comprising:
    in response to receiving a fence instruction, determining whether a first read/store request is executed, the first read/store request being received prior to receiving the fence instruction, the fence instruction being used for guaranteeing received read/store requests are executed in order;
    receiving a second read/store request; and
    in response to the first read/store request being executed prior to the fence instruction, executing the second read/store request.

7. The method of claim 6, further comprising:
    in response to the read/store request failing to be executed prior to the fence instruction, refusing to execute the second read/store request.

8. The method of claim 1, further comprising creating the plurality of files by mapping physical addresses of physical storage resources over which the plurality of files are distributed to contiguous logical addresses.

9. The method of claim 1, wherein for each one of the plurality of files, the virtual size is always at least as large as the mapped size.

10. The method of claim 9, wherein for each one of the plurality of files, the mapped size is always at least as large as the file size.

11. An electronic device, comprising:
    at least one processing unit; and
    at least memory coupled to the at least one processing unit and storing machine-executable instructions, the instructions, when implemented by the at least one processing unit, causing the device to perform acts, comprising:
        selecting, from a plurality of files, the plurality of files including a plurality of previously created empty files each storing no data, a target file for storing data, based on a size of data to be stored, wherein the plurality of files each have contiguous logical addresses and are allocated physical storage resources, wherein the physical storage resources allocated to each one of the plurality of files have contiguous physical addresses, and wherein each one of the plurality of files has a file size indicating an actual size of the data stored in the file, a virtual size indicating an amount of virtual address space allocated to the file, and a mapped size indicating an amount of physical address space allocated to the file;

determining a logical address offset of the target file relative to start logical addresses of the plurality of files based on an index of the target file;

determining physical storage resources corresponding to the target file based on a mapping relationship between logical addresses and physical addresses of a storage system, the start logical address, and the logical address offset; and storing the data on the corresponding physical storage resources.

12. The electronic device of claim 11, wherein the acts further comprise:

determining whether unallocated physical storage resources in the storage system is lower than a predetermined threshold of physical storage resource;

in response to the unallocated physical storage resources being lower than the predetermined threshold of physical storage resource, determining whether a total number of the empty files in the plurality of files is higher than a predetermined threshold number; and in response to the total number of the empty files being higher than the predetermined threshold number, releasing physical storage resources being allocated to the empty files.

13. The electronic device of claim 11, wherein the acts further comprise:

receiving a request to read the data;

determining the target file based on the request;

determining the logical address offset of the target file relative to the start logical address of the plurality of files based on the index of the target file;

determining the physical storage resources corresponding to the target file based on the mapping relationship, the start logical address, and the logical address offset; and reading the data from the corresponding physical storage resources.

14. The electronic device of claim 11, wherein the acts further comprise:

in response to receiving a fence instruction, determining whether a first read/store request is executed, the first read/store request being received prior to receiving the fence instruction, the fence instruction being used for guaranteeing a received read/store request is executed in order;

receiving a second read/store request; and in response to a read/store request being executed prior to the fence instruction, executing the second read/store request.

15. The electronic device of claim 14, wherein the acts further comprise:

in response to the read/store request failing to be executed prior to the fence instruction, refusing to execute the second read/store request.

16. The electronic device of claim 14, wherein the acts further comprise creating the plurality of files by:

mapping physical addresses of physical storage resources over which the plurality of files are distributed to contiguous logical addresses.

17. A computer program product having a non-transitory computer readable medium which stores a set of instructions to implement a file system; the set of instructions, when carried out by computerized circuitry, causing the computerized circuitry to perform a method of:

selecting, from a plurality of files, the plurality of files including a plurality of previously created empty files each storing no data, a target file for storing data, based on a size of data to be stored, wherein the plurality of files each have contiguous logical addresses and are allocated with physical storage resources, wherein the physical storage resources allocated to each one of the plurality of files have contiguous physical addresses, and wherein each one of the plurality of files has a file size indicating an actual size of the data stored in the file, a virtual size indicating an amount of virtual address space allocated to the file, and a mapped size indicating an amount of physical address space allocated to the file;

determining a logical address offset of the target file relative to a start logical address of the plurality of files based on an index of the target file;

determining physical storage resources corresponding to the target file based on a mapping relationship between logical addresses and physical addresses of a storage system, the start logical address, and the logical address offset; and storing the data on the corresponding physical storage resources.

* * * * *